C. L. SPELLMAN.
FLAX PULLER.
APPLICATION FILED JUNE 24, 1914.
1,148,058.
Patented July 27, 1915.
4 SHEETS—SHEET 3.
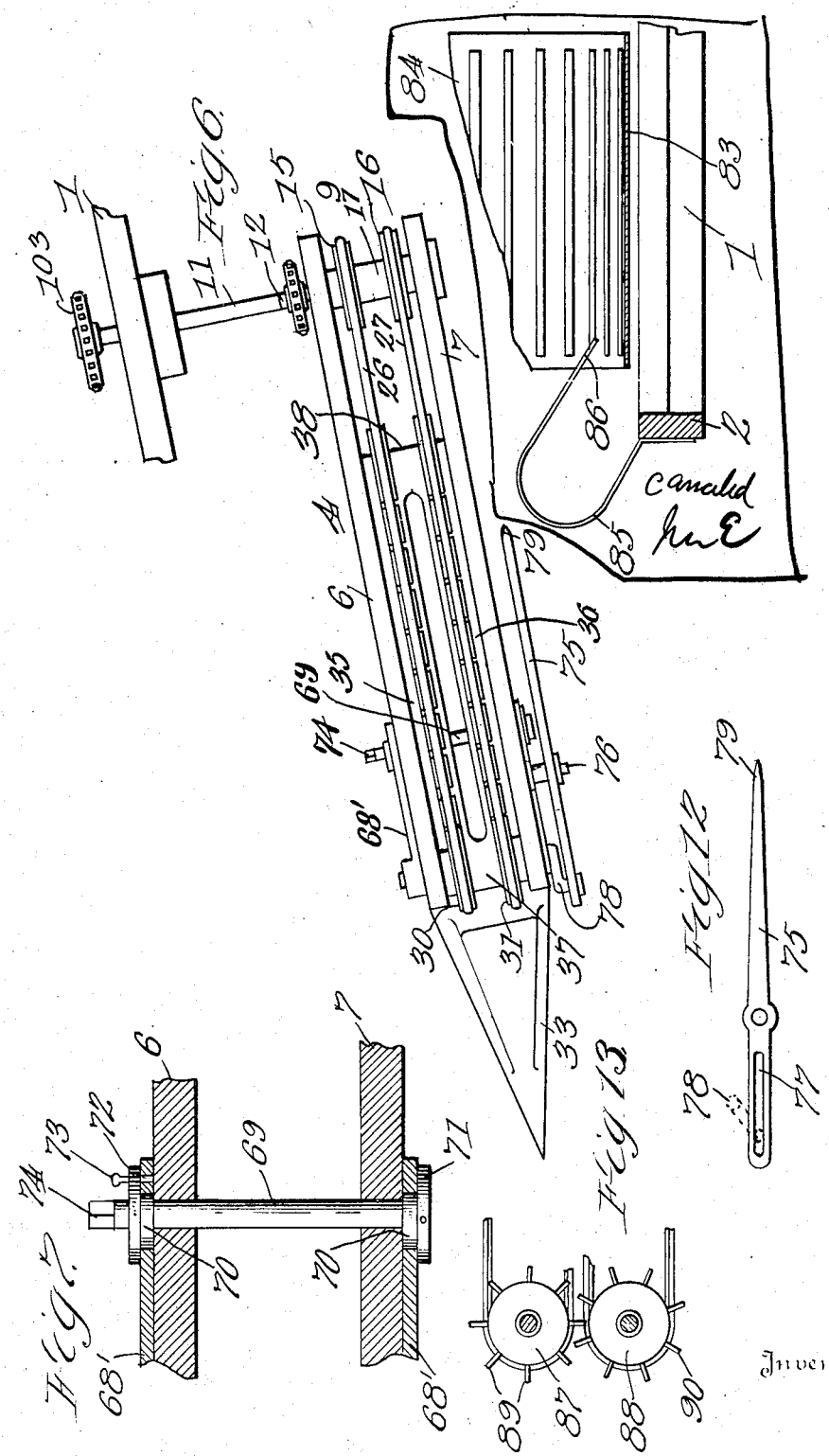

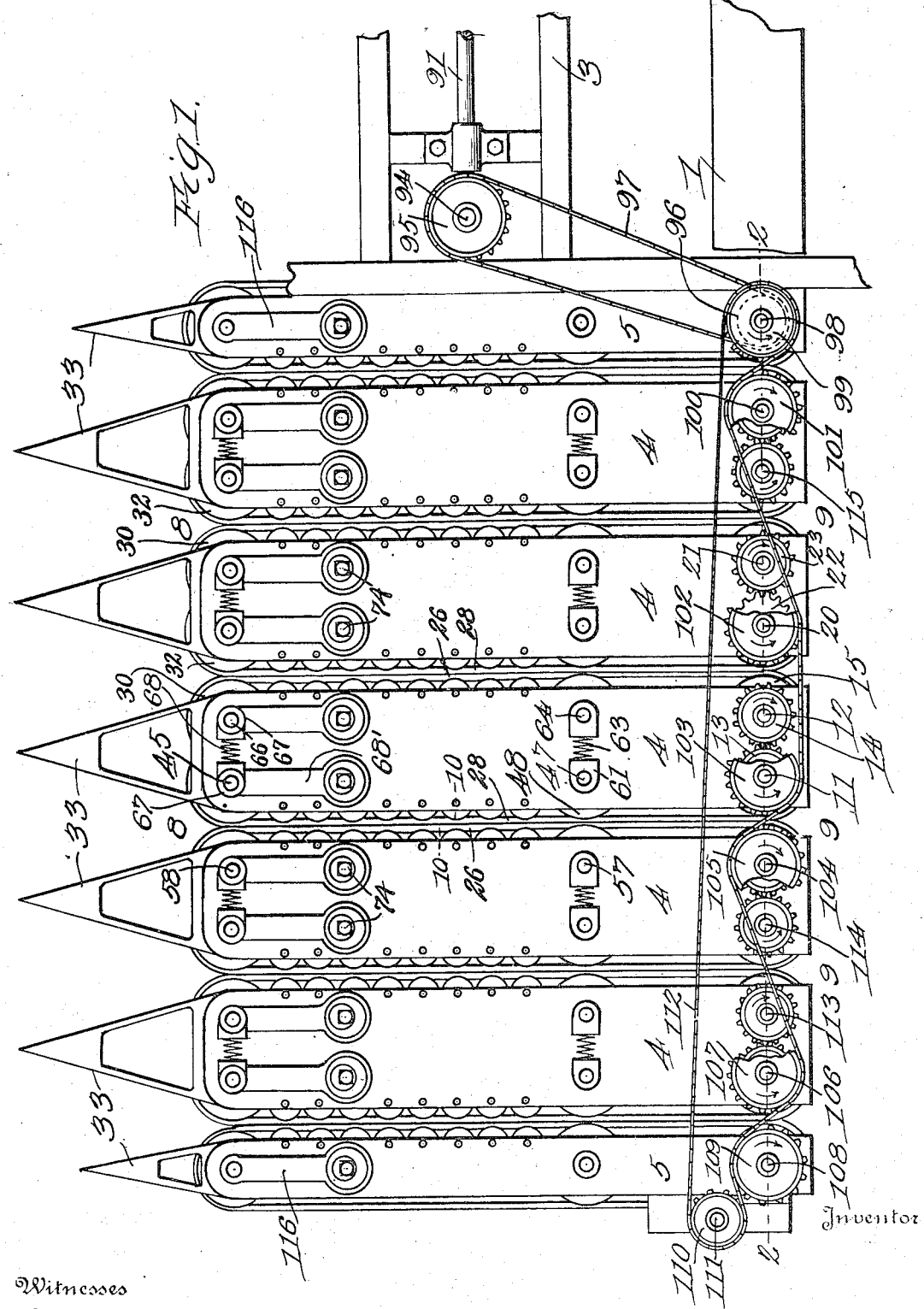

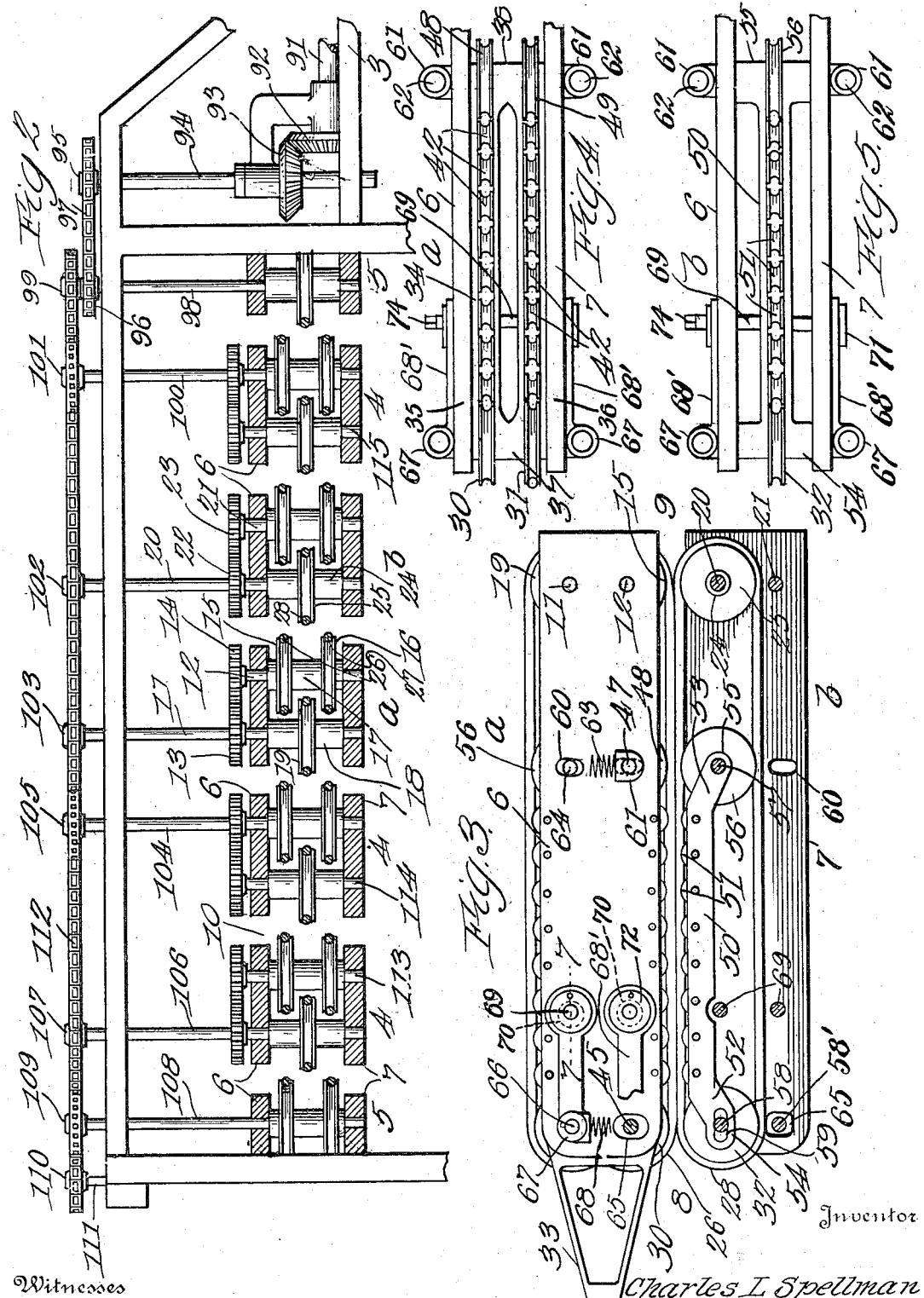

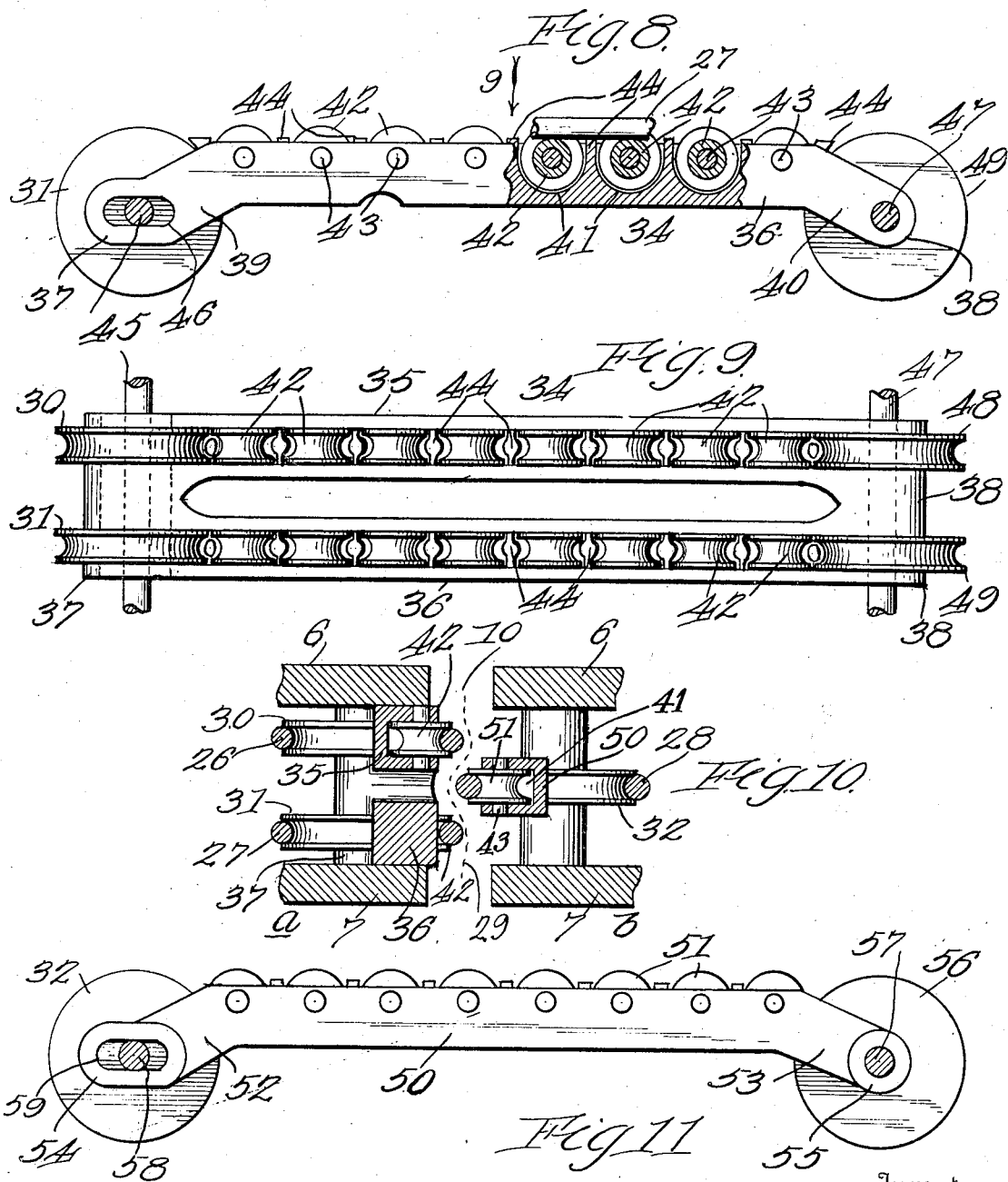

UNITED STATES PATENT OFFICE.

CHARLES L. SPELLMAN, OF WASHINGTON, DISTRICT OF COLUMBIA.

FLAX-PULLER.

1,148,058.  Specification of Letters Patent.  Patented July 27, 1915.

Application filed June 24, 1914. Serial No. 847,054.

*To all whom it may concern:*

Be it known that I, CHARLES L. SPELLMAN, a citizen of the United States, residing at Washington, District of Columbia, have invented new and useful Improvements in Flax-Pullers, of which the following is a specification.

This invention relates to improvements in harvesters for that kind of crop which must be pulled out of the ground in contradistinction to grains or grain crops, wherein the stalks are cut off near the ground when harvested, the device of my invention being especially designed for harvesting hemp or flax.

In harvesters of this class coacting belts have been employed for gripping the flax on opposite sides thereof, the belts being inclined upwardly rearwardly with respect to the direction of travel of the harvester in order to facilitate up-rooting of the flax gripped by the belts as the harvester advances.

An important feature of my invention resides in the provision of interlapping or intermeshing coacting belts, which serve to crimp or flex the flax when the same is gripped so as effectively to hold the flax very securely and thereby prevent any release of the flax under resistance incident to up-rooting of the same.

A further object of the invention resides in the provision of means for supporting the belts against flexure away from gripping positions during that portion of travel beginning with gripping engagement and terminating after the flax has been up-rooted, such means in the most improved embodiment comprising movable and fixed elements disposed in such close proximity as to afford a practically continuous and uninterrupted supporting surface or surfaces for the belts.

A further object of the invention is to provide improved mountings for the belts, whereby the same may not only be tightened or tensioned but also yieldingly advanced into coacting relation with each other to provide for narrowing or widening the intervening passage space between coacting belts in accordance with the bulk of flax gripped thereby.

Further objects and features of the invention will be more fully described in connection with the accompanying drawings, and will be more particularly pointed out and ascertained in and by the appended claims.

In the drawings:—Figure 1 is a plan view embodying one form of my invention, shown as an attachment to a binder. Fig. 2 is a sectional view on line 2—2 of Fig. 1. Fig. 3 is a plan view of two adjacent units with parts omitted from one unit to show internal mechanism. Fig. 4 is a side elevation of one unit. Fig. 5 is a side elevation of the other unit. Fig. 6 is a vertical longitudinal sectional view taken through a portion of the binder and illustrating my improved flax attachment in side elevation with parts in section. Fig. 7 is a sectional view on an enlarged scale taken on line 7—7 of Fig. 3. Fig. 8 is a plan view, partly in section, of a double belt supporting device. Fig. 9 is an upside down side view thereof looking in the direction of arrow 9 of Fig. 8. Fig. 10 is a sectional view on line 10—10 of Fig. 1. Fig. 11 is a plan view of a single belt supporting means. Fig. 12 is a detail view of one form of flail. Fig. 13 is a modified form of the invention, illustrating the application of gathering pins applied to the belt sheaves.

Like characters of reference designate similar parts throughout the different figures of the drawings.

The device of my invention is herein illustrated in the form of an attachment to a binder or like machine but it will be understood that I do not wish to be limited to this particular detail of structure, as my invention essentially resides in a flax or like puller for pulling and then releasing the flax irrespective of further treatment, which the latter may be subjected to after it has been released.

As illustrated, 1 designates a portion of a binder frame provided with a lateral frame structure 3, supported by the bull wheel, not herein shown.

Reverting more particularly to the device of my invention, the same includes a plurality of units 4 disposed in parallel and lateral spaced relation with respect to each other and inclined upwardly rearwardly from their forward ends. Associated with the units 4, which may be termed intermediate units, are end units 5 which make up the equipment constituting my invention.

Inasmuch as all of the intermediate units are of like construction and operation, it will only be necessary to describe two adjacent units and reference will now be made more particularly to Figs. 3, 4, and 5.

Each unit comprises upper and lower elongated leaves 6 and 7, which may be of wood and which extend continuously from the throat or intake portions 8 to the discharge portions 9 of the units, a passage space 10 being provided between adjacent units. Journaled in the discharge end of the unit shown in Fig. 3 are shafts 11 and 12, which are geared to rotate in unison by means of gears 13 and 14, mounted on said shafts 11 and 12, respectively. On shaft 12 I mount, non-rotatively, spaced discharge end belt sheaves 15 and 16, which are mounted upon a hub sleeve 17 of such length as to maintain the upper and lower leaves of the unit in suitable spaced relation. On shaft 11 is non-rotatably mounted a hub sleeve 18 having a centrally disposed discharge end belt sheave 19, which projects between the sheaves 15 and 16, but there is no coaction between the parts of this single unit except the fact that the shafts 11 and 12 are geared to be driven in unison. The coaction which I will now describe takes place between the belts of adjacent units, which will be particularly designated as $a$ and $b$. Unit $b$ is provided with end shafts 20 and 21, which are connected to operate in unison by gears 22 and 23, and on shaft 20 is mounted a sheave hub 24 having a single sheave 25. Belts 26 and 27 are trained about sheaves 15 and 16, respectively, and a belt 28 is trained about sheave 25, and it will be seen that the sheaves are disposed in staggered order, as regards the vertical and that the coacting belts 26 to 28 interlap sufficiently so that flax interposed therebetween will not only be gripped, but will also be reversely flexed so that gripping action will result in crimping the flax as indicated by dotted line 29 in Fig. 10. Belts 26 and 27 are trained about throat or entrance sheaves 30 and 31, and belt 28 is trained about an entrance sheave 32. At the forward ends of the units I provide converging pointed gatherers 33, which guide the flax toward the throat ends 8 and into the passageways 10.

During passage of the flax between the laps of coacting belts 26 to 28 throughout a portion of said laps, the flax is first gripped at the throat end, and owing to the upward inclination of the units, the gripped flax is pulled so as to up-root the same, and during such operation it is essential to provide a most effective grip on the flax to prevent intervening stalks or blades from slipping between the belts and thereby escaping action by the harvester, and I thereby provide means for supporting intermediate belt laps, which means I will now describe in detail.

Referring more particularly to Figs. 4 and 9, 34 designates, as a whole, a double belt supporter comprising bars 35 and 36, which are formed integral with and terminate in hubs or journal boxes 37 and 38. The ends of the bars 35 and 36 are offset, as indicated at 39 and 40 so as to project the bars 35 and 36 laterally slightly from the leaves 6 and 7, as indicated in Fig. 10. The bars 35 and 36 are hollowed out at suitably spaced intervals as indicated at 41, to receive belt supporting rolling elements in the form of idler wheels 42, which are journaled on spindles 43. The idler wheels 42 are disposed in close proximity, but in order to provide a substantially continuous support for the belts, I equip the bars with fixed belt supporting elements 44, which project between the wheels 42 and support the belts during passage between said wheels, as indicated in Fig. 8. The box 37 is bifurcated to receive sheaves 30 and 31 and the latter are mounted upon a tension shaft 45, which extends through an oblong tension bore 46, with which the box 37 is provided so that the tension shaft 45 can be adjusted with respect to the drive shaft 12 to tighten the belts 26 and 27. A pivot shaft 47 extends through box 38 and the latter is bifurcated to receive sheaves 48 and 49, which function primarily as idler belt supporting sheaves which are preferably of the same diameter as sheaves 30 and 31. In view of the fact that the next coacting belt 28, is a single belt, the supporting bar 50 therefor has a single row of idler supporting wheels 51, and the offset ends 52 and 53 are provided with boxes 54 and 55 and are bifurcated to receive sheave 32 and an idler sheave 56. Idler sheave 56 is mounted upon a pivot spindle 57, and sheave 32 is mounted upon a tension spindle 58. Box 54 is provided with an oblong bore 59 to afford tension displacement for spindle 58.

I will next describe the manner in which the belt supporting bars are mounted in the upper and lower leaves 6 and 7, of the units $a$ and $b$. Referring more particularly to Fig. 3, 60 designates one of a pair of slots with which the upper leaf 6, and likewise the lower leaf 7, will be provided to permit of lateral advancing movement of the pivot spindles 64, 47 and 57 therein. These spindles are all alike in operation and structure, but they have been designated by different numerals in order to distinguish the one from the other in describing their function. Each pivot spindle is provided with a head, one of which is shown at 61, for spindle 47, as having a spring socket 62 therein. A spring socket is provided for the upper and lower end of each spindle and the sockets are more clearly shown in Figs. 4 and 5. An expansively acting spring 63 is shown seated in the socket of head 61, in Fig. 3, and extends toward pivot shaft 64, and will be seated in a socket provided in a socket head for shaft 64, similar to head 61 but not shown in connection with shaft 64. The socket head is omitted from shaft 64 to illustrate the movement of said shaft in slot 60, in Fig. 3. Thus it will be understood that the opposite ends of the spindles 47 and 64 will be urged outwardly, above and below the leads 6 and 7, by springs 63. It will be noted that slots 60 are disposed transversely with respect to the length of the unit so as not to permit of any longitudinal movement of bar 34 or bar 50, as the case may be. At the entrance end of each unit, the upper and lower leaves 6 and 7 are provided with enlarged and transversely elongated slots 65. Tension shafts 66, 45, 58 and 58' are disposed in said slots and may be moved or adjusted longitudinally therein, with respect to the units, because of the enlargement of said slots with respect to said shafts, and also transversely. Each shaft 66, 45, 58 and 58' is provided with a socket head 67 having a socket therein similar to socket 62 for receiving the ends of an expansively acting spring 68. Thus spring 68, as shown in Fig. 3, will normally tend to urge shafts 66 and 45, laterally opposite.

It will now be seen that I have provided yieldingly acting means for advancing both ends of bars 34 and 50, with their sheaves and supporting wheels toward each other, so that either end may move independently to accommodate an increase or decrease in bulk or volume of intervening flax, thereby always insuring an effective grip.

I will next describe the manner in which the entrance sheaves and their tension spindles are displaced longitudinally of their units in order to tighten the belts. Each head 67 is provided with an arm 68', which extends rearwardly to an adjusting shaft 69, the latter being journaled in leaves 6 and 7, as indicated more particularly in Fig. 7. Adjusting shaft 69 is provided with cams 70, which are rotatable in suitable openings in the arms 68', and the cams or eccentrics 70 serve to advance or retract the arm 68' when the shaft 69 is rotatively adjusted. The shaft 69 is provided on its lower end with a removable flange or collar 71 for holding the arm 68' in position. Said shaft 69 is provided on its upper end with a collar 72 through which a locking pin 73 may be extended into suitable apertures formed in arm 68' so as to lock shaft 69 in adjusted positions. The upper end of shaft 69 is provided with a polygonal wrench portion 74, whereby the same may be rotated. It will be understood that the belts of each unit will be provided with a tension device similar to the one just described.

After the flax has been up-rooted, the roots thereof may carry quantities of earth which would interfere with subsequent handling of the flax in the binder, and therefore I provide means for removing the clods and earth from the pulled flax.

In the preferred construction I provide each unit with a flail 75, as indicated in Fig. 6. The flail 75 is in the form of a bar mounted upon a pivot 76, between its ends, and provided with a crank slot 77. One of the tension shafts may be provided with a crank 78, adapted for projection into slot 77 to oscillate the free end 79 of the flail in order to knock off the clods of dirt.

As shown more particularly in Fig. 13, I may provide the entrance sheaves 87 and 88, of coacting units, with gathering pins 89 and 90.

I will next refer to the manner in which the sheaves of the several units are driven, reference being had more particularly to Figs. 1 and 2. Shaft 91 may be suitably connected in driven relation with the bull wheel, not shown, and is connected by gears 92 and 93 with shaft 94. Shaft 94 carries a sprocket 95 over which and a sprocket 96 a sprocket chain 97 is trained. Sprocket 96 is mounted upon drive shaft 98 of one of the end units 5, and said shaft 98 is provided with a sprocket wheel 99. Shaft 100 is provided with a sprocket wheel 101, and shaft 20 is provided with a sprocket wheel 102. Shaft 11 is provided with a sprocket wheel 103, shaft 104 is provided with a sprocket wheel 105, shaft 106 is provided with a sprocket wheel 107, and shaft 108 is provided with a sprocket wheel 109. An idler sprocket wheel 110 is mounted upon a shaft 111. A sprocket chain 112 is trained about said wheels, as clearly shown in Fig. 1, in a manner to drive the sprocket shafts in the direction indicated by the arrows. It will be clear by reference to Fig. 2 how the end sheave shafts 113, 114, 21, and 115 are driven by the gear connections shown, and particularly described with reference to units $a$ and $b$.

As regards the end units 5, I have not shown the same provided with yielding means such as springs 63 and 68 to advance their belts into gripping relation with belts of adjacent units, although such means may be provided if desired, the said end units being provided with tensioning devices 116, similar to that shown in Fig. 7.

It is believed that the advantages and utility of my invention will be clear from the foregoing description, and while I have herein shown and described specific forms of my invention, I do not wish to be limited thereto except for such limitations as the claims may import.

I claim:—

1. In a flax or like pulling machine, spaced units forming an intervening passage for the flax, drive and tension shafts for said units, drive and tension sheaves mounted on said shafts, respectively, coacting belts trained about the sheaves for engagement with the flax in said passage by their acting laps, devices pivoted to said units between said sheaves for engagement with the acting laps to urge the latter into gripping position and having lost motion connection with said tension shafts, and means for displacing said tension shafts to tension the belts, substantially as described.

2. In a flax or like pulling machine, a unit provided with tension and drive shafts having tension and drive sheaves thereon, a belt trained about said sheaves for engagement with the flax by one of its laps, a bar movably mounted in said unit between said shafts and journaled on said tension shaft and provided with a plurality of fixed elements for supporting the acting lap of said belt in engagement with the flax, a plurality of revoluble elements mounted in said bar for engagement with said acting lap and forming with said fixed elements a substantially continuous lap supporting surface preventing flexure of the acting lap under pressure on the flax, substantially as described.

3. In a flax or like pulling machine, a unit having a drive shaft near its discharge end provided with a sheave, a tension shaft loosely journaled in said unit near its intake end and provided with a sheave, a pivot shaft loosely journaled in said unit between said tension and drive shafts and provided with a sheave, a belt trained about said sheaves and having its acting lap projecting into the path of the flax to be gripped, a belt supporter pivoted on said pivot shaft and loosely journaled on said tension shaft, said belt supporter having means for engaging the acting lap to support the same in engagement against the flax, means mounted on said unit for displacing said tension shaft to tension the belt, a yielding device engaging said tension shaft to actuate the same and said belt supporter to force the acting lap of the belt toward the flax, and a yielding device engaging said pivot shaft to force the same and said belt supporter toward the flax to be gripped, substantially as described.

4. In a flax or like pulling machine, an elongated unit, a drive shaft journaled in said unit and provided with a sheave, a tension shaft loosely journaled in said unit to move transversely therein and having a sheave thereon, a pivot shaft loosely journaled in said unit between said drive and tension shafts to move transversely of said unit and being provided with a sheave, a flax gripping belt trained about said sheaves, a belt supporter engaging the acting lap of the belt between said tension and pivot shafts and being mounted on said shafts, means for shifting said tension shaft longitudinally in said unit to tighten the belt, and devices normally acting to shift said tension and pivot shafts and the supporter mounted thereon transversely of said unit to advance the acting lap of the belt into gripping relation with the flax, substantially as described.

5. In a flax or like pulling machine, a unit provided with tension and drive sheaves, a belt trained about said sheaves for engagement with the flax with its acting lap, an acting lap engaging device pivotally mounted in said unit between said sheaves and movable laterally of said unit bodily and at its point of pivotal mounting in said unit, said tension sheave being movable laterally and longitudinally of said unit, means for effecting longitudinal adjusting movement of said tension sheave to tension said belt, and devices for effecting movement of said tension sheave and said belt engaging device laterally of said unit, irrespective of the tension of said belt, for increasing the grip of said acting lap on the flax, substantially as described.

6. In a flax or like pulling machine, a unit provided with tension and drive sheaves, a belt trained about said sheaves for engagement with the flax with its acting lap, an acting lap engaging mechanism pivotally mounted in said unit between said sheaves and movable laterally of said unit bodily and at its point of pivotal mounting in said unit, said tension sheave being movable laterally of said unit, and devices for effecting lateral movement of said tension sheave and mechanism for increasing the grip of said acting lap on the flax, substantially as described.

7. In a flax or like pulling machine, a unit provided with a drive sheave and a tension sheave, a tension shaft for said tension sheave mounted in said unit for movement laterally thereof, a belt trained about said sheaves for engagement with the flax with its acting lap, an acting lap engaging device pivotally mounted in said unit between said sheaves and movable laterally of said unit at its point of pivotal mounting therein and being also journaled on said tension shaft, and devices for effecting lateral movement of said engaging device and said tension sheave for increasing the grip of said acting lap on the flax, substantially as described.

8. In a flax or like pulling machine, a unit provided with a drive sheave and a tension sheave, a tension shaft for said tension sheave mounted in said unit for movement laterally thereof, a belt trained about said sheaves for engagement with the flax with its acting lap, an acting lap engaging device movably mounted in said unit at one of its ends between said sheaves and having its other end journaled on said tension shaft, and independently acting spring devices for shifting said tension shaft and said engaging device laterally of said unit to increase the grip of said acting lap on the flax, substantially as described.

9. In a flax pulling machine, a unit, a tension shaft loosely journaled in said unit for adjustment longitudinally and transversely of the longitudinal axis of said unit, a sheave on said tension shaft, a belt trained about said sheave, means pivotally mounted on said unit and pivotally connected with said shaft for shifting the latter longitudinally of said unit to tension the belt, and means for shifting said shaft transversely of said unit for increasing the gripping action of said belt upon the flax, substantially as described.

10. In a flax or like pulling machine, a unit, a tension shaft loosely journaled in said unit for adjustment longitudinally and transversely of said unit, a sheave on said shaft, a belt trained about said sheave, means rotatable in said unit and pivotally connected with said shaft for shifting the latter longitudinally of said unit, and means for shifting said shaft transversely of said unit, substantially as and for the purposes described.

In testimony that I claim the foregoing as my own, I hereby affix my signature in the presence of two subscribing witnesses.

CHARLES L. SPELLMAN.

Witnesses:
CLINTON DODGE,
JOHN L. FLETCHER.